US005142486A

United States Patent [19]

Gunthary, Jr. et al.

[11] Patent Number: 5,142,486

[45] Date of Patent: Aug. 25, 1992

[54] ELECTRONIC MONITORING DEVICE

[76] Inventors: Walter Guntharp, Jr., 661 Holiday Dr., Fortville, Ind. 46040; James Sobek, 448 N. 300 West, Greenfield, Ind. 46140; Russell W. Boring, 3275 Twisted Oaks La., Jacksonville, Fla. 32223

[21] Appl. No.: 607,984

[22] Filed: Oct. 31, 1990

[51] Int. Cl.[5] .................... G06F 3/00

[52] U.S. Cl. .................... 364/709.04

[58] Field of Search .................... 364/709.02, 709.04, 364/710.12, 710.13, 401, 406

[56] References Cited

U.S. PATENT DOCUMENTS

| | | | |
|---|---|---|---|
| 4,405,241 | 9/1983 | Aihara et al. | 364/710.12 X |
| 4,833,632 | 5/1989 | Nishimura | 364/709.04 |
| 4,961,158 | 10/1990 | Sussman | 364/709.04 |

*Primary Examiner*—Tan V. Mai

*Attorney, Agent, or Firm*—Luedeka, Hodges, Neely and Graham

[57] ABSTRACT

An electronic device for monitoring the number of hours worked during a period covering a preselected number of consecutive work days utilizes a case and a computer mounted in the case including memory containing information relating to a maximum number of hours which are permitted to be worked during the period of consecutive work days and to a maximum number of hours which are permitted to be worked during any one work day of the period. The computer includes a keyboard for manually entering at the end of each day of the period the number of hours worked during that one day and a processor responsive to the number of hours entered through the keyboard for calculating the number of hours worked during a consecutive day period ending with that one day, the permitted number of work hours remaining during a consecutive day period ending no earlier than the following day and the number of hours that the user is permitted to work on the following day. A digital display associated with the case displays the calculated numbers of hours to the user.

10 Claims, 2 Drawing Sheets

ELECTRONIC MONITORING DEVICE

BACKGROUND OF THE INVENTION

This invention relates generally to means and methods for keeping records and relates more particularly to monitoring devices for keeping track of the number of hours worked during a period comprised of a preselected number of work days.

Regulations have evolved which limit the number of hours that commercial drivers, such as truck and bus drivers, may drive or work over a period comprised of a preselected number of consecutive work days and which require that records be maintained and updated to reflect the number of hours driven or worked during the most recent consecutive work day period.

Currently, regulations restrict the number of work hours that a truck or bus driver may work to sixty hours during a seven-day period or seventy hours during an eight day period. Whether the seven or eight day period applies to a driver may depend upon the nature of the truck or bus operation for which the driver works. Moreover, the regulations also limit the number of hours that a driver is permitted to drive over the course of one work day. In order for the driver to comply with these regulations, he must, at the end of each day, record the number of hours worked during that one day and update his record to reflect the hours worked in the most recent seven or eight day period. In continually updating the record, the driver must on a daily basis add the hours for the previous six or seven days worked and subtract the total from sixty or seventy to determine the number of work hours still available in the period. The alternative is to review the previous seven or eight day total, subtract the oldest entry and add in the hours worked during that one, i.e., current, day. Either method is laborious and subject to errors which may result in violations of the regulations or exposure to fines.

Violations of the regulations may also occur when drivers, either through lack of mathematical ability, human error, or failure to comprehend the regulations either fail to or mistakenly calculate their work hours correctly and therefore exceed the limitations on their duty hours. If such violations are discovered, fines or other penalties may result. Mistaken calculations may also result in the failure to complete an assigned delivery date on time due to an unrealized lack of available time in which to complete the delivery. In addition, non-monitored or improperly monitored hours may lead to driver fatigue and increase the likelihood of accidents as a result of fatigue-related mental errors.

Thus, it can be seen that failure to properly compute the number of hours worked and/or the number of driving hours available within a preselected time frame may lead to fines, freight delays and/or accidents.

It would be desirable to provide a new and improved device for monitoring the number of hours worked over a preselected period of consecutive days.

Another object of the present invention is to provide such a device which readily informs the user of the number of hours remaining during a preselected period of days that he is permitted to work.

Still another object of the present invention is to provide such a device which readily informs a user of the number of hours that he is permitted to work during the next day of the period in light of the number of hours during the period in which he has already worked.

Yet another object is to provide such a device which provides the user with an indication that the maximum permitted number of work hours during the preselected period has been exceeded.

A further object of the present invention is to provide such a device which is easy to use and effective in operation.

A still further object of the present invention is to provide such a device which also includes a calculator.

SUMMARY OF THE INVENTION

This invention resides in an electronic device for monitoring the number of hours worked during a period comprised of a preselected number of consecutive work days wherein there exists a maximum number of hours which are permitted to be worked during the period of consecutive work days.

The device comprises a case and computer means mounted within the case including memory means containing information relating to the maximum number of hours which are permitted to be worked during the period of consecutive work days. The computer means also includes input entry means including a keyboard for manually entering at the end of each day of the period the number of hours worked during that one day. Processing means are responsive to the number of hours entered through the keyboard for totaling the number of hours entered for that one day with any work hours which have been previously entered through the keyboard at the end of days which immediately precede that one day for a number of days which is equal to the number of days in the preselected period minus one to obtain a total number of hours and for generating a first display signal corresponding to the total number of hours. The processing means is also responsive to the number of hours entered through the keyboard for totaling the number of hours entered for that one day with any work hours which have been previously entered through the keyboard at the end of days which immediately precede that one day for a number of days which is equal to the number of days in the preselected period minus two to obtain a first resultant number of hours and for subtracting the first resultant number of hours from the maximum number of hours which are permitted to be worked during the period of consecutive work days to obtain a second resultant number of hours and for generating a second display signal corresponding to the second resultant number of hours. The device also includes display means mounted in the case and connected to the computer means for receiving the first display signal generated by the processing means for displaying the total number of hours so that the user is visually informed of the number of hours worked during a consecutive day period ending with that one day and for receiving the second display signal generated by the processing means for displaying the second resultant number of hours so that the user is visually informed of the number of permitted work hours remaining during a period of consecutive work days ending no earlier than the following day.

In a particular embodiment of the invention, the memory means contains information relating to a maximum number of hours which are permitted to be worked during any one work day during the period of days. The processing means includes means for comparing the second resultant number of hours to the maximum number of hours that are permitted to be worked during any one work day and generating one signal corresponding to the second resultant number of hours when the second resultant number of hours does not exceed the maximum number of hours that are permitted to be worked in any one work day or generates another signal corresponding to the maximum number of hours that are permitted to be worked in any one work day when the second resultant number of hours exceeds the maximum number of hours that are permitted to be worked in any one work day. The display means is responsive to the one or the another signal generated by the comparing means of the processing means for displaying the number of hours to which the one or another signal corresponds so that the user is visually informed of the number of work hours that he is permitted to work during the next day.

DETAILED DESCRIPTION OF THE ILLUSTRATED EMBODIMENTS

Figure 1:
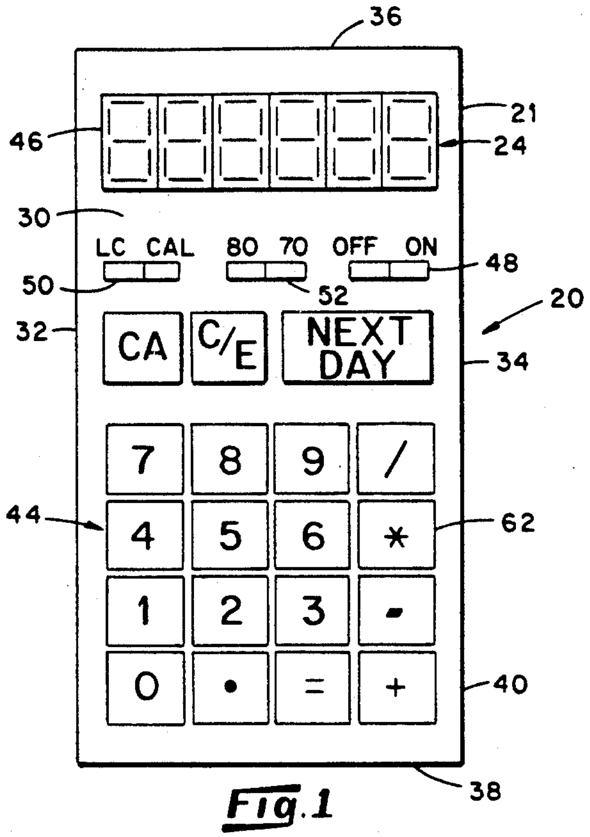
FIG. 1 illustrates in plan view one embodiment of an electronic monitoring device within which features of the present invention are incorporated.

Turning now to the drawings in greater detail, there is illustrated in FIG. 1 an embodiment 20 of a device which can be used to keep track of the number of hours worked over a period comprised of a preselected number of consecutive work days and for visually informing a user of the number of hours worked during the period of consecutive work days ending with the current day, the number of hours that he is permitted to work during a consecutive-day period ending no earlier than the day following the current day, and the number of hours that he is permitted to work during the day following the current day. The depicted device 20 is particularly well-suited for use by truck or bus drivers who are limited by regulations from working more than a predetermined number of working hours during a period comprised of a preselected number of work days and are limited by regulations from working more than a predetermined number of working hours during any one work day of the period. However, it will be understood that the device 20 may be utilized by others who, for record-keeping purposes, are required to monitor the accumulation of hours worked over a period of days and must compare the number of accumulated hours or the number of hours worked during any one day with prescribed limits. Accordingly, the principles of the present invention may be variously applied.

Figure 2:
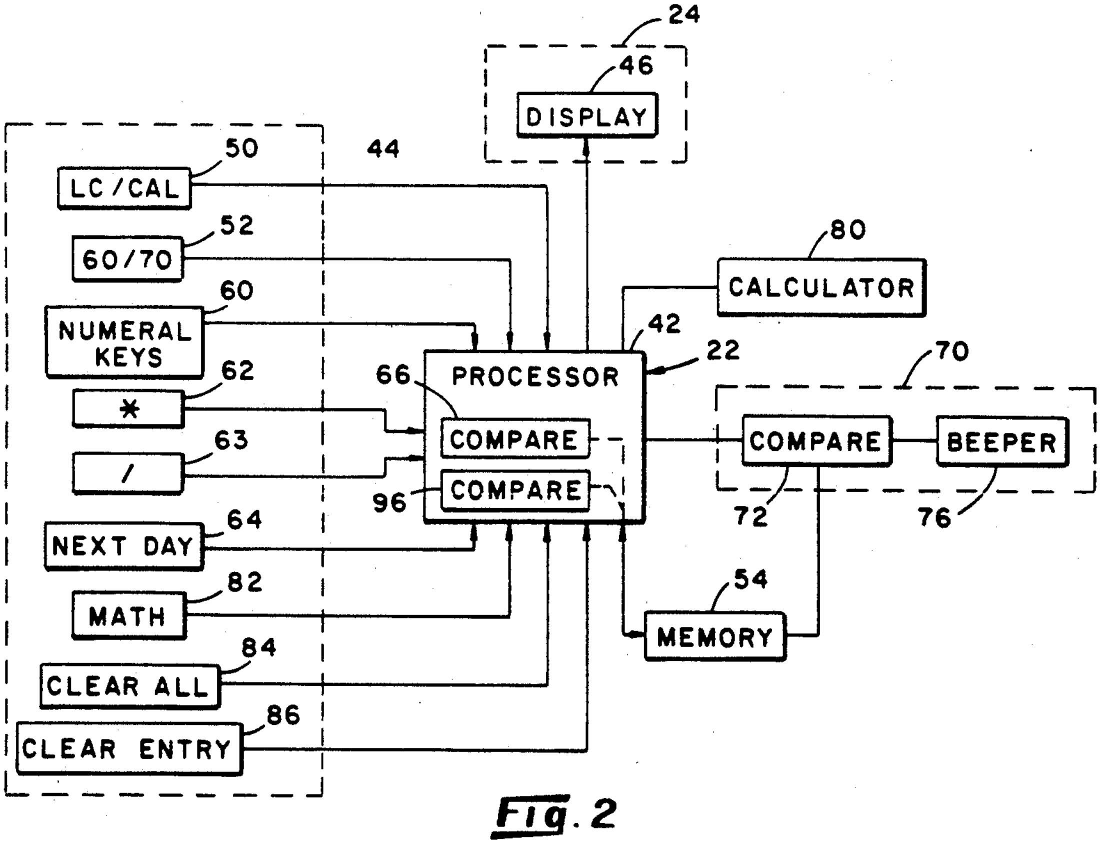
FIG. 2 is a block diagram illustrating the controls of the device of FIG. 1.

With reference to FIGS. 1 and 2, the device 20 includes a box-like case 21 and computer means, generally indicated 22, mounted within the case 21. As will be apparent herein, the computer means 22 includes means enabling a user to record at the end of each day of the period of consecutive work days the number of hours worked during that one day and for performing a series of mathematical calculations with the entered number of hours worked to determine the total number of hours which have been worked during the consecutive period of days ending with that one day, the number of hours remaining which are permitted to be worked during a consecutive work day period ending no earlier than the day following that one day, and the number of hours which are permitted to be worked during the next work day. Display means 24 are associated with the computer means 22 and mounted within the case 21 for visually displaying to the user the results of the calculations which have been performed by the computer means 22.

The case 21 includes a top 30, two opposite sides 32, 34, two opposite ends 36, 38 and a bottom 40. The computer means 22 includes input entry means in the form of a manual keyboard 44 permitting a user to manually enter at the end of each day of the period the number of hours worked during that one day. The keyboard 44 as illustrated consists of a plurality of numeral keys, math function keys and operating keys for controlling the various modes of operation of the device 20 as described in greater detail in connection with FIG. 2. The display means 24 includes a digital display 46 provided in conjunction with the keyboard 44 and is comprised of multiple groups of LEDs or LCDs which are arranged in the conventional 7-segment configuration to generate number characters. The computer means 22 also includes a microprocessor 42 which is appropriately connected to the keyboard 44 for receiving input entries made through the keyboard 44 and for performing the various calculations, described in detail herein, with the input entries.

In addition to the computer means 22 and display 24, the case 21 also supports an ON/OFF switch 48 for controlling power in the device 20. Preferably, the device 20 is a self-contained unit as shown, and electrical power for operating the computer means 22 and the associated controls is derived from a battery pack positioned within the case 21. However, an external power supply may also be used.

The device 20 also includes a first select switch 50 and a second select switch 52 mounted in the case top 30 as shown in FIG. 1. The first select switch 50 is a two-position switch which permits the user to switch the operation of the device 20 between a log/check mode during which the number of hours worked in a work day are entered and various mathematical functions are performed with the entered days and a calculator mode enabling the device 20 to operate as a standard calculator. The second select switch 52 is a two-position switch which permits the user to select, once the device 20 is switched to its log/check mode, between a 60-hour mode of operation corresponding to an 60-hour limit on the number of hours worked over a preselected number of consecutive work days and a 70-hour mode of operation corresponding to a 70-hour limit on the number of hours worked over a preselected number of consecutive work days. Memory means 54 is mounted within the case 21 and appropriately wired to the switch 52 and has been preprogrammed with the number of hours, i.e., sixty, that the user is permitted to work over a consecutive seven-day period and with the number of hours, i.e., seventy, that the user is permitted to work over a consecutive eight-day period. By appropriately positioning the switch 52 in one of its two positions, subsequent calculations performed by the computer means 22 during the log/check mode of the device 20 take into account the work hour limits stored within memory means 54.

It is a feature of the present invention that the microprocessor 42 is responsive to the number of hours entered through the keyboard 44 so that the work hours entered for a given day is totalled with any work hours which have been previously entered through the keyboard 44 at the end of days which immediately precede the given day for a number of days which is equal to the number of days in the preselected period minus one. In this connection, the memory means 54 is adapted to store a number of entries which is at least as great as the number of days in the preselected period. For operation of the device 20 in the 60-hour mode, the memory means 54 accepts at least seven entries, and for operation of the device 20 in the eight-day mode, the memory means 54 accepts at least eight entries. For a reason apparent herein, the memory means 54 has also been preprogrammed with information relating to the maximum number of hours that are permitted to be worked during any one work day of the preselected period. For operation of the device 20 in its 60-hour mode (corresponding to a current regulatory limit of the number of work hours permitted over a consecutive seven day period), the memory means 54 has been preprogrammed with knowledge of a sixty hour limit. Similarly, for operation of the device 20 in its 70-hour mode (corresponding to a current regulatory limit of the number of work hours permitted over a consecutive eight day period), the memory means 54 has been preprogrammed with knowledge of a seventy hour limit.

With reference to FIG. 2, it will be observed that the memory means 54 is connected to the keyboard 44 through the microprocessor 42. After the device 20 is switched ON and the log/check mode has been selected, the device 20 is placed in one of its 60-hour or 70-hour modes of operation by positioning the switch 52 in the appropriate position. The number of hours worked at the end of one day is then entered through the numeral keys 60 and is entered into the memory means 54 and simultaneously into the digital display 46. After the entry of work hours has been placed in memory, the asterisk (*) key 62 is pressed to command the microprocessor 42 to perform a series of mathematical operations with the entered number of hours in order to determine the total number of hours worked during the most recent consecutive-day period ending with the one day, and then displaying the total number of hours worked to the user by way of the display 46.

More specifically, upon depression of the asterisk key 62, the microprocessor 42 totals the number of hours worked at the end of one day, i.e., the last work day for which an entry was made, with any work hours which have been previously entered through the numeral keys 60 which immediately precede that one day for a number of days which is equal to the number of days in the preselected period minus one to obtain a total number of hours and for generating a first display signal corresponding to this calculated total number of hours. The number of work hours which have been previously entered are stored in the memory means 54 for the totalling operation performed by the microprocessor 42. The aforementioned total number of hours determined by the microprocessor 42 is the total number of hours worked during a period of consecutive work days ending with the one work day. The first display signal generated by the microprocessor 42 is received by the display means 24 so that the determined total number of work hours is displayed on the display 46.

If a number of input entries have been entered into the memory means 54 which is less than the number of work days in the period to which the selected 60-hour or 70-hour mode corresponds minus one, the input number of hours worked for the one day, or current day, is simply totalled by the microprocessor 42 with the number of work hours previously entered, and the total number is displayed on the display 46. For example, if the device 20 is operating in its 60-hour (i.e., 7-day) mode and only four prior entries have been entered into the memory means 54 by the time that the entry of the hours worked during the fifth day is made, the hours of the prior four entries and the fifth day is simply totalled to obtain a total number of hours.

If, on the other hand, a number of input entries have been entered into the memory means 54 which is equal to or is greater than the number of work days to which the selected 60-hour or 70-hour mode corresponds minus one, the input number of hours worked for a given day is totalled by the microprocessor 42 with only the number of hours which have been entered by way of entries which immediately precede the entry for the given day by a number equaling the number of days in the period minus one. More specifically, only the entries which precede the current or given day for no more than the number of work days in the preselected period minus one are totalled with the hours worked for the current day. To this end, the microprocessor 42 is adapted to take into account the number of hours entered during the earliest entry accepted upon entry of the number of hours worked during the last day of a period comprised of a preselected number of days so that the microprocessor 42 totals only the hours worked for a period of consecutive days equal to the number of days in the preselected period and ending with the current day. In practice, the microprocessor 42 automatically subtracts the earliest entry and adds the newest entry thereby providing a total number of hours for the most recent consecutive-day period ending with the last day for which an entry was made.

For example, if the device 20 is operating in its 60-hour, i.e., 7-day, mode and seven entries have been previously entered into the memory means 54 by the time the entry of hours worked during the eighth day is made, the earliest one of the previous seven entries is subtracted from the total number of hours worked during the period of eight consecutive days ending with the eighth day so that the six entries which represent the input from the six days which immediately precede the eighth day is totalled with the hours entered for the eighth day. The resultant total is thus representative of the total number of hours worked for a consecutive seven day period ending with the eighth day. When displayed on the display 46, the resultant total therefore visually informs the user of the number of hours worked for the most recent period of consecutive work days ending with the last day for which work hours were entered.

The device 20 also includes means, indicated 70 in FIG. 2, for audibly indicating to the user that the number of work hours permitted during the preselected period of consecutive work days has been exceeded. To this end, the audible signal generating means 70 includes comparison circuits 72 for receiving and comparing the signal generated by the microprocessor 42 corresponding to the total number of hours worked during the most recent period of consecutive work days ending with the last day for which an entry was made with the maximum number of hours (e.g., 60 or 70 hours) permitted to be worked in a preselected period of consecutive days and further includes a beeper 76. If, when comparing the total number of hours worked with the maximum number of hours permitted to be worked during the period of days, the circuits 72 determine that the maximum number of permitted hours has been exceeded, the circuits 72 activate the beeper 76. Thus, the audible signal generating means 70 provides the user with information in the form of an audible signal that the permitted number of hours which may be worked during a preselected period of days has been exceeded by the actual number of hours worked.

The aforedescribed audible indicating means 70 is suitably connected to the microprocessor 42 and memory means 54 so that upon determination by the circuits 72 that the total number of hours worked during the most recent period of consecutive work days ending with the last day for which an entry was made has been exceeded by the maximum permitted number of hours available, the circuits 72 activate the beeper 74.

After the total number of hours worked during the most recent consecutive-day period has been displayed on the display 46, the slash (/) key 63 is pressed to command the microprocessor 42 to determine the number of permitted work hours remaining during a consecutive work day period ending no earlier than the following day and then displaying the smaller of this permitted number of work hours and a predetermined maximum value to the user by way of the display 46. More specifically, upon depression of the slash key 63, the microprocessor 42 totals the number of hours worked at the end of one day, i.e., the last work day for which entry was made, with any work hours which have been previously entered through the numeral keys 60 which immediately precede that one day for a number of days which is equal to the number of days in the preselected period minus two to obtain a first resultant number of hours, subtracts this calculated first resultant number of hours from the maximum number of hours which are permitted to be worked during the period of consecutive work days to obtain a second resultant number of hours. This second resultant number of hours calculated by the microprocessor 42 is the number of permitted work hours remaining during a consecutive-day period ending no earlier than the day following that one day.

The device 20 includes a comparison circuit 96 for comparing this resultant number with a maximum value representative of the maximum number of driving hours which current regulations from the Department of Transportation restrict a driver from exceeding during a twenty-four hour period. In the depicted device 20, the comparison circuit 96 compares the resultant number with a maximum value of fifteen stored within the memory 54 and is appropriately connected to the display means 24 for displaying either the resultant number or the number fifteen, depending upon the results of the comparison made by the circuit 96. More specifically, if the resultant number is equal to or less than fifteen, the resultant number is displayed on the display 46, and if the resultant number is greater than fifteen, the number fifteen is displayed on the display 46.

If, on one hand, a number of input entries have been entered into the memory means 54 which is less than or equal to the number of work days in the period to which the selected 60-hour or 70-hour mode corresponds minus two, the input number of hours worked for the one, or current, day is simply totaled with the previously entered number of work hours to obtain one total number, the one total number is subtracted from the maximum number of hours permitted to be worked during the consecutive day period to obtain a resultant number, and then the resultant number (or the number fifteen) is displayed on the display 46. For example, if the device 20 is operating in its 60-hour mode and only two prior entries have been entered into the memory means 54 by the time that the entry of hours worked during the third day is made, the hours of the prior two entries and the third day are simply totaled and subtracted from sixty to obtain a resultant number. The comparison circuit 96 then compares the resultant number to the predetermined maximum value, i.e., fifteen hours, representative of the current driving hour limit for a twenty-four hour period, and the smaller of the compared number and value is displayed on the display 46.

If, on the other hand, a number of input entries have been entered into the memory means 54 which is greater than the number of work days in the period to which the selected 60-hour or 70-hour mode corresponds minus two, the input number of hours worked for a given day is totaled with only the number of hours which have been entered by way of entries which immediately precede the entry for the given day by a number equaling the number of days in the period minus two. More specifically, only the entries which precede the given day entry for no more than the number of work days in the preselected period minus two are totaled with the hours worked for the given day. To this end, the memory means 54 is adapted to take into account the two earliest entries accepted upon entry of the number of hours worked during the last day of a period comprised of a preselected number of consecutive days ending with the last day so that the microprocessor 42 totals only the hours worked for a period of consecutive days equal to the number of days in the preselected period minus one. In the device 20, the microprocessor 42 subtracts the two earliest entries made during a consecutive day period ending with the current day and adds the newest entry thereby providing a total number of hours for the recent consecutive-day period comprised of a number of days of the preselected period minus one and ending with the current day. For example, if the device 20 is operating in its 60-hour, i.e., 7-day, mode and six entries have previously been entered into the memory means 54 by the time the entry of hours worked during the seventh day is made, the earliest one of the previous six entries is subtracted from the total number of hours worked during the period of seven consecutive days ending with the seventh day so that the five entries which represent the input from the five days which immediately precede the seventh day is totaled with the hours entered for the seventh day. The resultant total is then subtracted from the permitted sixty hours of the period to obtain a resultant number. The resultant number is then compared with the aforementioned maximum value, i.e., fifteen hours, by the comparison circuit 96, and the smaller of the compared number and value is displayed on the display 46.

After the smaller of the number of permitted work hours remaining during a consecutive work day period ending no earlier than the following day and the aforementioned maximum value has been displayed on the display 46, the next day key 64 is pressed to command the microprocessor 42 to determine the number of hours that the user may work during the next work day and send an appropriate signal to the display means 24 for displaying the next day's available hours. In this connection, the microprocessor 42 includes comparison means 66 for comparing the previously-calculated number of permitted work hours remaining during the consecutive work day period ending no earlier than the following day with the maximum number of hours permitted to be worked during any one day of the period to determine the smaller of the two compared number of hours and generating a signal corresponding to the smaller of the compared number of hours. One signal corresponding to the number of hours available during the remainder of the preselected period is generated by the microprocessor 42 when the number of hours remaining during the consecutive work day period ending no earlier than the following day does not exceed the maximum number of hours that are permitted to be worked in any one work day, and another signal corresponding to the maximum number of hours that are permitted to be worked in any one work day is generated by the microprocessor 42 when the number of hours available during the remainder of the consecutive work day period ending no earlier than the following day exceeds the maximum number of hours that are permitted to be worked in any one work day. The display means 24 is suitably connected to the comparison means 66 of the microprocessor 42 for receiving the signal generated by the comparison means 66 and displaying the smaller of the compared number of hours. The smaller of the compared number of hours represents the number of hours that the user is permitted to work during the next work day and when displayed by the display 46, visually informs the user of that number of work hours.

In the depicted device 20, the memory means 54 has been preprogrammed with information that the maximum number of permitted work hours in any one day is fifteen hours. Such a maximum number corresponds with current regulations which limit the number of hours that common commercial drivers may drive to fifteen hours during any one day, i.e., a twenty-four hour period. If, for example, the microprocessor 42 has concluded its calculation that the number of hours available during the remainder of the consecutive work day period ending no earlier than the following day is ten hours, then upon pressing the next day key 64, the comparison means 66 compares ten with fifteen, and the number ten is subsequently displayed on the display 46. If, on the other hand, the microprocessor 42 has concluded its calculation that the number of hours available during the remainder of the consecutive work day period ending no later than the following day is twenty hours, then upon pressing the next day key 64, the comparison means 66 compares twenty with fifteen, and the number fifteen is subsequently displayed on the display 46.

The device 20 also includes calculator circuitry 80, and this circuitry 80 responds to the numeral keys 60 and the math function keys 82 in a manner of a standard electronic calculator. It will be understood that the switch 50 must be positioned in the calculator mode in order for the device 20 to be operated as a calculator. Accordingly, the device 20 combines capabilities to monitor the number of hours worked during a period comprised of a preselected number of consecutive work days with the capabilities of a standard calculator and is advantageous in this respect.

The keyboard 44 also includes a clear all key 84 and a clear entry key 86 appropriately connected to the microprocessor 42 for enabling the operator to clear the display 46 to a zero or null condition. As is the case with a standard calculator, depression of the clear all key 84 clears from the display 46 and memory of the device 20 selected information with which a mathematical computation is being performed, and depression of the clear entry key 86 clears from the display 46 and memory of the device 20 only the most recent entry.

Figure 3:
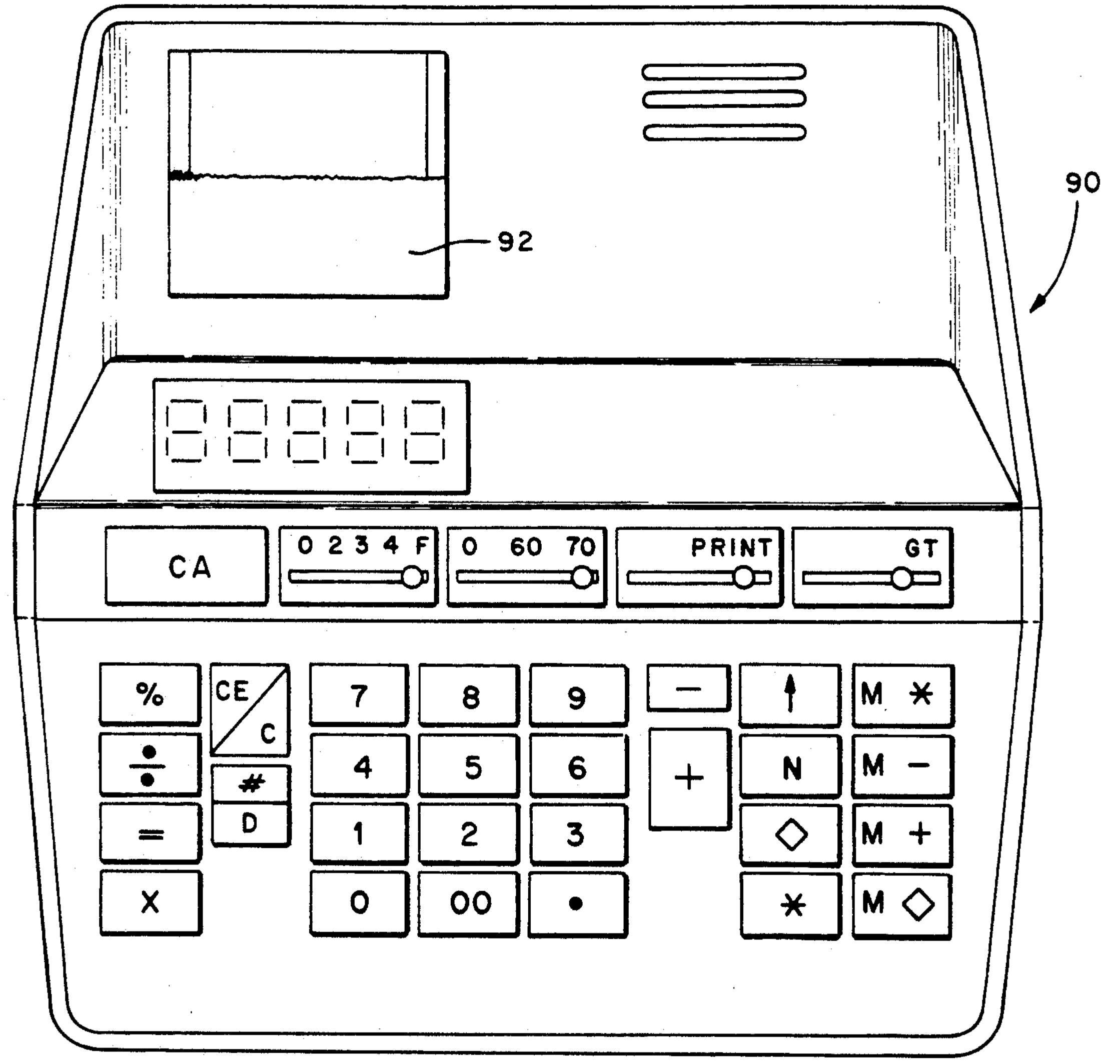
FIG. 3 illustrates in plan view another embodiment of an electronic monitoring device within which features of the present invention are embodied.

It will be understood that numerous modifications and substitutions can be had to the aforedescribed embodiments without departing from the spirit of the invention. For example, although the device 20 has been shown and described as a hand-held unit, there is illustrated in FIG. 3 a desktop version 90 of the device in accordance with the broader aspects of the present invention. In this embodiment 90 of the device, the basic modes of operation and components are substantially the same as described above except that the embodiment 90 includes means for generating a printout 92 of calculations performed by its microprocessor and identifying with an asterisk or the like on that printout 92 the calculated totals which exceed the maximum number of hours permitted to be worked over a preselected period. In addition, the device 20 also includes warning means for audibly indicating to the user when, for example, the total number of hours worked for a preselected number of consecutive number of days is within a selected range of hours. Accordingly, the aforementioned embodiment 20 is intended for the purpose of illustration and not as limitation.

We claim:

1. An electronic device for monitoring the number of hours worked during a period comprised of a preselected number of consecutive work days wherein there exists a maximum number of hours which are permitted to be worked during the period of consecutive work days, said device comprising:

a case;

computer means mounted within the case including a) memory means containing information relating to the maximum number of hours which are permitted to be worked during the period of consecutive work days;

b) input entry means including a keyboard for manually entering at the end of each day of the period the number of hours worked during that one day;

c) processing means responsive to the number of hours entered through the keyboard for totaling the number of hours entered for that one day with any work hours which have been previously entered through the keyboard at the end of days which immediately precede that one day for a number of days which is equal to the number of days in the preselected period minus one to obtain a total number of hours and for generating a first display signal corresponding to the total number of hours, and said processing means being responsive to the number o hours entered through the keyboard for totaling the number of hours entered for that one day with any work hours which have been previously entered through the keyboard at the end of days which immediately precede that one day for a number of days which is equal to the number of days int he preselected period minus two to obtain a first resultant number of hours and for subtracting the first resultant number of hours form the maximum number of hours which are permitted to be worked during the period of consecutive work days to obtain a second resultant number of hours and for generating a second display signal corresponding to the second resultant number of hours; and display means mounted in the case and connected to the computer means for receiving the first display signal generated by the processing means for displaying the total number of hours to that the user is visually informed of the number of hours worked during a consecutive day period ending with that one day and for receiving the second display signal generated by the processing means for displaying the second resultant number of hours so that the user is visually informed of the number of permitted work hours remaining during a consecutive day period ending no earlier than the following day; and said keyboard includes a first command key operatively connected to the processing means for automatically initiating the operations of the processing means involving the totaling of the number of hours to obtain a total number of hours and the generating of the first display signal upon entry at the end of each day the number of hours worked during the day and a second command key operatively connected to the processing means for automatically initiating the operations of the processing means involving the totaling and subtracting of the numbers of hours to obtain a second resultant number of hours and the generating of the second display single so that following the entry through the keyboard of the number of hours worked during that one day, a single depression of the first command key automatically initiates the operations of the processing means and display means including the obtaining of a total number of hours by the processing means and the displaying of the total number of hours by the display means and a single depression of the second command key following the depression of the first command key automatically initiates the operations of the processing means and display means including the obtaining of the second resultant number of hours by the processing means and the displaying of the second resultant number of hours by the display means.

2. The device as defined in claim 1 further comprising circuit means associated with said processing means for detecting, upon entry of the number of hours worked during that one day, any overshoot of the maximum number of hours which are permitted to be worked during the period of consecutive work days by the total number of hours worked during a consecutive day period ending with that one day and for generating an audible signal upon detection of the overshoot.

3. The device as defined in claim 2 wherein said circuit means for detecting overshoot includes means for comparing the maximum number of hours which are permitted to be worked during the period of consecutive work days with the total number of hours and for producing an audible signal when the maximum number of hours which are permitted to be worked during the period of days are exceeded by the total number of hours.

4. The device as defined in claim 1 wherein there exists a maximum number of hours which are permitted to be worked during any one work day of the preselected period of days;

the memory means contains information relating to the maximum number of hours which are permitted to be worked during any one work day of the preselected period of days;

the processing means includes means for comparing the second resultant number of hours to the maximum number of hours that are permitted to be worked during any one work day and either generating one signal corresponding to the second resultant number of hours when the second resultant number of hours does not exceed the maximum number of hours that are permitted to be worked in any one work day or generating another signal corresponding to the maximum number of hours that are permitted to be worked in any one work day when the second resultant number of hours exceeds the maximum number of hours that are permitted to be worked in any one work day; and the display means is responsive to the one or the another signal generated by the comparing means of the processing means for displaying the number of hours to which the one or the another signal corresponds so that the user is visually informed of the number of work hours that he is permitted to work during the next day.

5. The device as defined in claim 4 wherein the keyboard includes a command-initiate key operatively connected to the processing means for automatically initiating the operations of the processing means involving the comparing of the second resultant number of hours to the maximum number of hours that are permitted to be worked during any one work day and the generating of the one or the another signal upon entry of the end of each day the number of hours worked during the day.

6. The device as defined in claim 1 wherein the memory means contains information relating to the maximum number of hours which are permitted to be worked during each of two periods comprised of an alternative number of consecutive work days and the device further includes a switch operatively connected to the memory means permitting the user to select between the two periods so that operations performed by the processing means are based upon the maximum number of hours permitted to be worked during the selected period.

7. The device as defined in claim 1 wherein the keyboard includes numeral keys and math function keys and the device further includes calculator circuitry associated with the display means and responsive to the numeral keys and math function keys for performing mathematical calculations and for displaying the results of the mathematical calculations to the user through the display means.

8. An electronic device for monitoring the number of hours worked during a period comprised of a preselected number of consecutive work days wherein there exists a maximum number of hours which are permitted to be worked during the period of consecutive work days and wherein there exists a maximum number of hours which are permitted to be worked during any one work day of the period, said device comprising;

a case;

computer means mounted within the case and including a) memory means containing information relating to the maximum number of hours which are permitted to be worked during the period of consecutive work days and to the maximum number of hours which are permitted to be worked during any one work day of the period;

b) input entry means including a keyboard for manually entering at the end of each day of the period the number of hours worked during that one day;

c) processing means responsive to the number of hours entered through the keyboard for totaling the number of work hours entered for that one day with any work hours which have been previously entered through the keyboard at the end of days which immediately precede that one day for a number of days which is equal to the number of days in the preselected period minus one to obtain a total number of hours and for generating a first display signal corresponding to the total number of hours, and said processing means being responsive to the number of hours entered through the keyboard for totaling the number of work hours entered for that one day with any work hours which have been previously entered through the keyboard at the end of days which immediately precede that one day for a number of days which is equal to the number of days in the preselected period minus two to obtains a first resultant number of hours and subtracting the first resultant number of hours from the maximum number of hours that are permitted to be worked during the period of consecutive work days to obtain a second resultant number of hours and for generating a first display signal corresponding to the second resultant number of hours;

d) comparison means for comparing the second resultant number of hours to the maximum number of hours that are permitted to be worked during any one work day and either generating one signal corresponding to the second resultant number of hours when the second resultant number of hours does not exceed the maximum number of hours that are permitted to be worked in any one work day or generating another signal corresponding to the maximum number of hours that are permitted to be worked in any one work day when the second resultant number of hours exceeds the maximum number of hours that are permitted to be worked in any one work day; and display means mounted in the case and connected to the computer means for receiving the first display signal generated by the processing means for displaying the total number of hours so that the user is visually informed of the number of hours worked during a consecutive day period ending with that one day and for receiving the second display signal generated by the processing means for displaying the second resultant number of hours so that the user is visually informed of the number of permitted work hours remaining during a consecutive day period ending no earlier than the following day and for receiving the one or the another signal generated by the comparison means for displacing the number of hours to which the received one or the another signal corresponds so that the user is visually informed of the number of hours that he is permitted to work on the day following that one day; and said keyboard includes a first command key operatively connected to the processing means for automatically initiating the operations of the processing means involving the totaling of the number of hours to obtain a total number of hours and the generating of the first display signal upon entry at the end of each day the number of hours worked during the day and a second command key operatively connected to the processing means for automatically initiating the operations of the processing means involving the totaling and subtracting of the number of hours to obtain a second resultant number of hours and the generating of the second display signal so that following the entry through the keyboard of the number of hours worked during that one day, a single depression of the first command key automatically initiates the operations of the processing means and display means including the obtaining of a total number of hours by the processing means and the displaying of the total number of hours by the display means and a single depression of the second command key following the depression of the first command key automatically initiates the operations of the processing means and display means including the obtaining of the second resultant number of hours by the processing means and the displaying of the second resultant number of hours by the display means.

9. The device as defined in claim 8 further comprising circuit means associated with said processing means for detecting, upon entry of the number of hours worked during that one day, any overshoot of the maximum number of hours which are permitted to be worked during the period of consecutive work days by the total number of hours worked during a consecutive day period ending with that one day and for generating an audible signal upon detection of the overshoot.

10. The device as defined in claim 9 wherein said circuit means for detecting overshoot includes means for comparing the maximum number of hours which are permitted to be worked during the period of consecutive work days with the total number of hours and for producing an audible signal when the maximum number of hours which are permitted to be worked during the period of days are exceeded by the total number of hours.

* * * * *

UNITED STATES PATENT AND TRADEMARK OFFICE
CERTIFICATE OF CORRECTION

PATENT NO. : 5,142,486

DATED : August 25, 1992

INVENTOR(S) : Walter Guntharp, Jr., James Sobek and Russell W. Boring

It is certified that error appears in the above-identified patent and that said Letters Patent is hereby corrected as shown below:

Col. 10, line 57 (Claim 1), delete "o" and substitute --of-- therefor.

Col. 10, line 63 (Claim 1), delete "int" and substitute --in-- therefor.

Col. 10, line 64 (Claim 1), delete "he" and substitute --the-- therefor.

Col. 10, line 66 (Claim 1), delete "form" and substitute --from-- therefor.

Col. 11, line 8 (Claim 1), delete "to" and substitute --so-- therefor.

Col. 11, line 31 (Claim 1), delete "single" and substitute --signal-- therefor.

Signed and Sealed this

Twenty-eighth Day of September, 1993

*Attest:*

BRUCE LEHMAN

*Attesting Officer*

*Commissioner of Patents and Trademarks*